United States Patent [19]

Proctor

[11] 4,422,666

[45] Dec. 27, 1983

[54] SUSPENSION MECHANISM FOR AUTOMOTIVE VEHICLES

[75] Inventor: Rudy R. Proctor, Wheatridge, Colo.

[73] Assignee: Spring Technology, Ltd.

[21] Appl. No.: 290,350

[22] Filed: Aug. 5, 1981

[51] Int. Cl.³ .............................................. B60G 3/00
[52] U.S. Cl. ..................................... 280/694; 267/41; 280/719
[58] Field of Search ............... 280/694, 719, 720, 689, 280/699, 718, 669; 267/19 A, 41, 52, 160

[56] References Cited

U.S. PATENT DOCUMENTS

| 1,209,205 | 12/1916 | Ridgway | 280/669 |
|---|---|---|---|
| 1,299,165 | 1/1919 | Fulkerson | 280/669 |
| 1,993,080 | 3/1935 | Wolff | 267/19 |
| 2,071,714 | 2/1937 | Van Ranst | 267/41 |
| 2,236,868 | 4/1941 | Cook | 280/124 |
| 2,458,548 | 1/1949 | Aronson | 267/36 |
| 2,460,106 | 1/1949 | Rowland | 267/19 |
| 2,697,613 | 12/1954 | Glacosa | 280/124 |
| 2,998,970 | 9/1961 | Davis | 267/41 |
| 3,107,104 | 10/1963 | Angell | 280/124 |
| 3,149,855 | 9/1964 | Adloff et al. | 280/96.2 |
| 3,197,190 | 7/1965 | Miyashiro | 267/11 |
| 3,292,918 | 12/1966 | Hart | 267/11 |
| 3,869,140 | 3/1975 | Allison | 267/41 |
| 4,087,115 | 5/1978 | Earle | 280/720 |

FOREIGN PATENT DOCUMENTS 268728 10/1929 Italy ..................................... 280/669

Primary Examiner—Joseph F. Peters, Jr.
Assistant Examiner—Ross Weaver
Attorney, Agent, or Firm—John E. Reilly

[57] ABSTRACT

A vehicle suspension system comprises a combination of cantilevered spring members which extend in opposite directions across the front and rear ends of the vehicle and are supported between upper and lower bearing members which are spaced to regulate the degree of resistance to roll or cornering loads both at the front and rear end suspensions. Novel and improved A-frame assemblies with toe and camber adjustments are provided at the front end of the system, and outboard extensions are provided at the rear end to increase the effective span or extension of the spring members in countering any tendency of the vehicle to roll.

16 Claims, 8 Drawing Figures

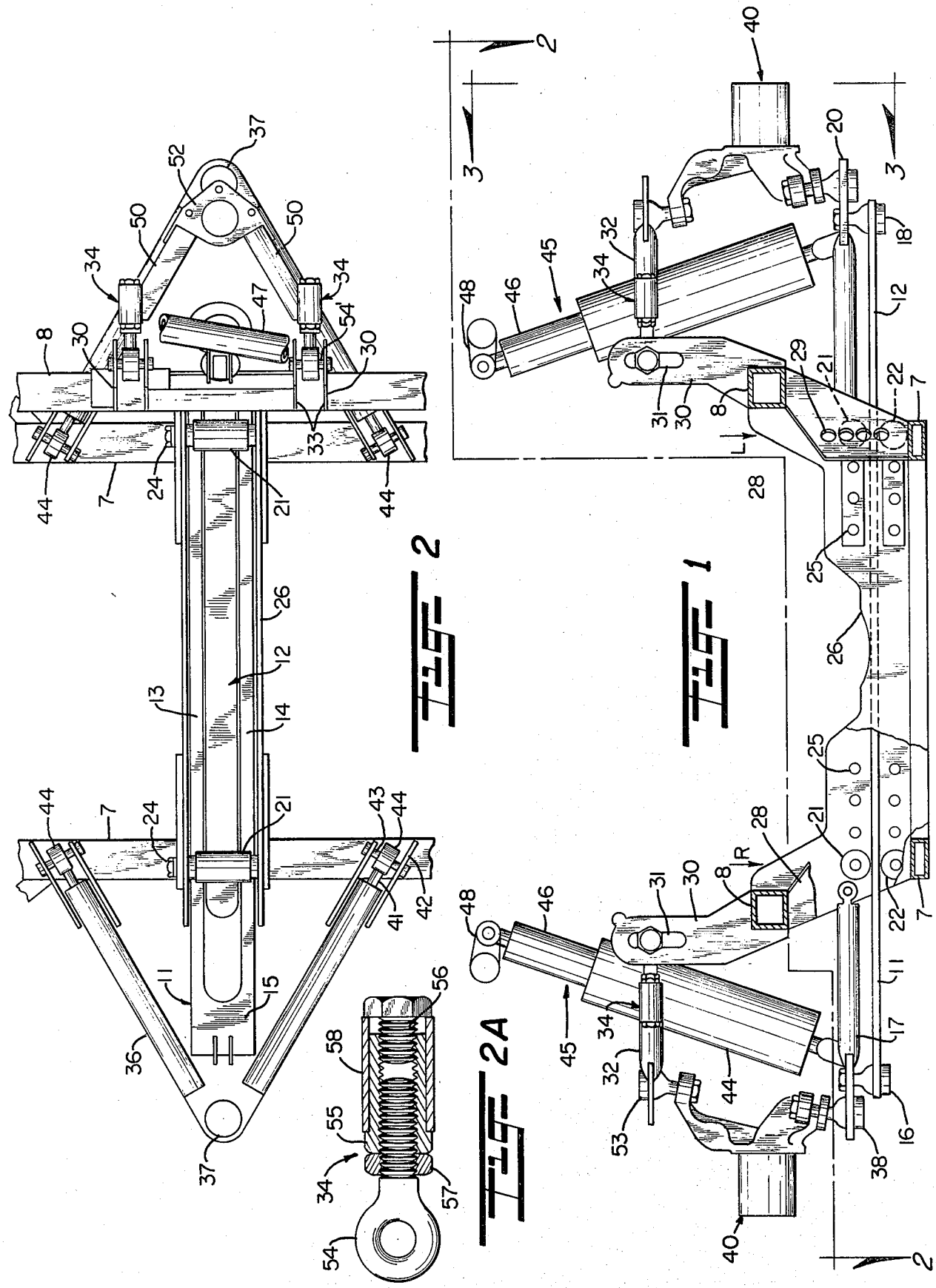

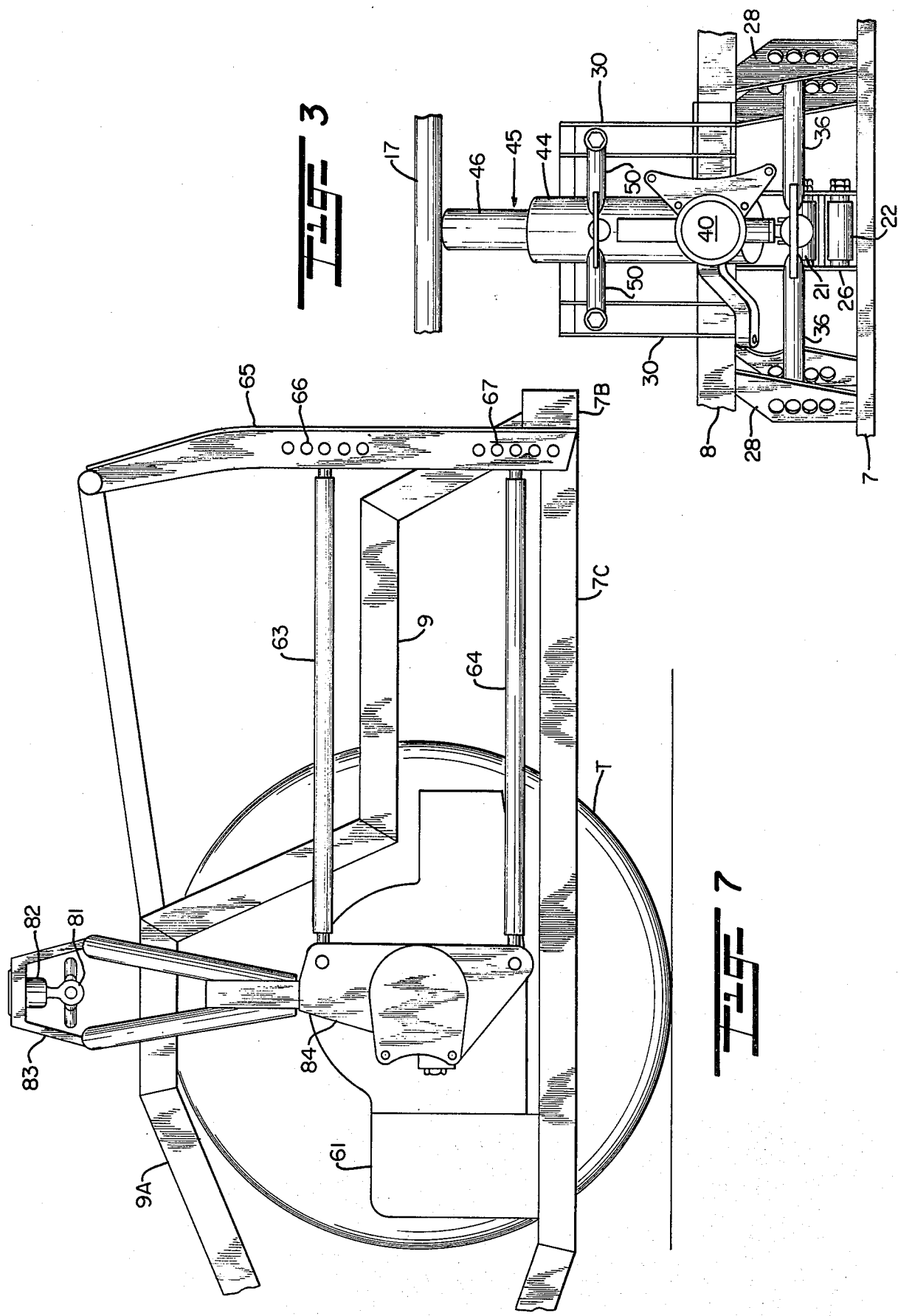

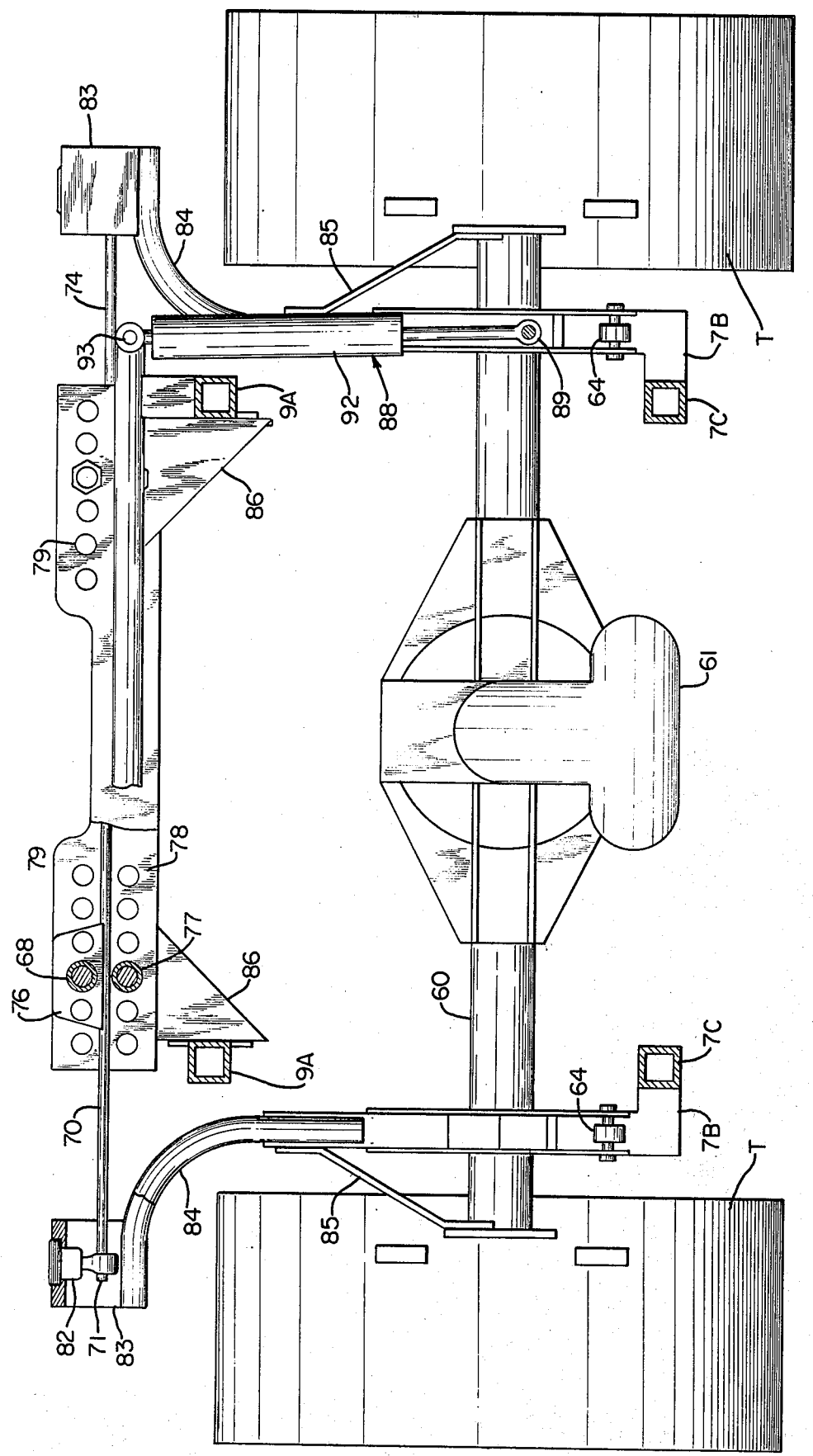

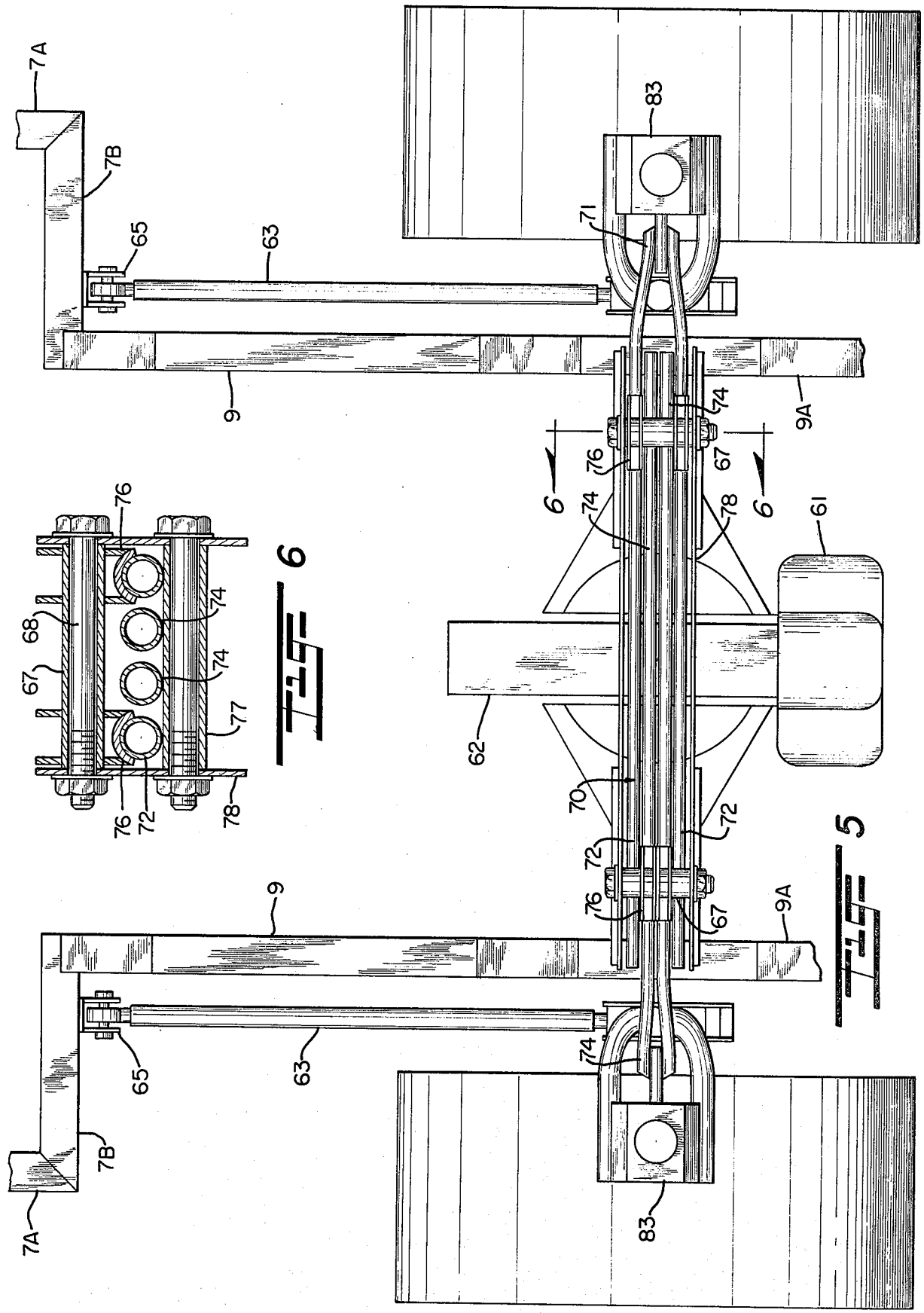

SUSPENSION MECHANISM FOR AUTOMOTIVE VEHICLES

This invention relates to a suspension mechanism, and more particularly relates to a novel and improved suspension mechanism for automotive vehicles and particularly racing vehicles and the like.

BACKGROUND AND FIELD OF THE INVENTION

The present invention may be best typified by reference to its use in racing cars in order to improve their driving performance and characteristics. Among such desirable characteristics are the ability to counteract centrifugal forces tending to cause sidewise or transverse roll of the vehicle without disturbing the normal performance of the vehicle suspension system; further to provide for a more simplified and effective means of controlling front-end alignment. In the past, various means have been proposed for counteracting or resisting vehicle roll or cornering loads which, for example, are imposed on the vehicle in rounding curves and which at higher speeds will tend to cause the wheels nearest the inside of the curve to be lifted. Representative of such approaches is that disclosed in U.S. Pat. to Hart No. 3,292,918 in which a relatively long flexible leaf spring extends transversely of the vehicle between opposite wheels and a relatively stiff spring overlies a portion of the longer spring and is flexibly connected to the longer spring so that it may be adjustably positioned along the length of the spring to selectively counteract roll forces. Thus, only roll forces generated for instance by a turn in a particular direction will act on the sprung weight of the vehicle so as to increase the loading on one end of the spring while decreasing it at the opposite end, the unbalanced loading tending to counteract undesirable roll of the vehicle. Similar approaches to that of Hart are disclosed in the early expired U.S. Pat. Nos. to Cook 2,236,868 and Giacosa 2,697,613. U.S. Pat. No. 3,149,855 to Adloff et al discloses a modification to the approach shown and disclosed in other patents and specifically wherein the outer ends of a lower leaf spring are connected to an upper leaf spring and the leaf springs are free to pivot at their mountings to the vehicle suspension system so that the lower leaf springs are capable of moving relative to the upper leaf springs. It has also been proposed to provide for transversely extending leaf springs which are pivotally mounted at opposite ends to the wheel spindle or suspension members with the principal aim being to devise an independent front wheel suspension system for automotive vehicles, such as typified in U.S. Pat. Nos. to Wolff 1,993,080 and Ridgway 1,209,205. Other representative U.S. Pat. Nos. are: 1,299,165 to Fulkerson; 2,458,548 to Aronson; 2,460,106 to Rowland; 3,107,104 to Angell; and 3,197,190 to Miyashiro.

The foregoing and other systems devised have definite limitations in their ability to transmit forces of sufficient magnitude to effectively counteract roll at higher speeds while at the same time providing a system which can be readily installed at the front and rear ends of a vehicle in such a way as to effectively counteract cornering loads at both ends.

SUMMARY OF THE INVENTION

It is therefore an object of the present invention to provide for a novel and improved suspension system for automotive vehicles which is conformable for use with different sizes and types of vehicles and which is highly dependable and efficient in operation.

Another object of the present invention is to provide for a novel and improved suspension system for automotive vehicles and the like which is capable of counteracting laterally directed forces and cornering loads tending to cause the vehicle to roll about its longitudinal axis and which is compact and easy to install.

It is a further object of the present invention to provide for an automotive vehicle suspension system while is capable of counteracting roll by means of cantilevered arms supported at one or more predetermined spaced intervals such that any downward forces imparted to one side of the vehicle will generate a counteracting force to the opposite side tending to resist any lifting forces or motion on the opposite side.

It is an additional object of the present invention to provide for a compact suspension system for automotive vehicles and the like which is integrated at the front and rear ends of the vehicle so as to counteract roll without disturbing the shock absorbing capability of the vehicle.

It is a still further object of the present invention to provide for an adjustable suspension system for automotive vehicles which is capable of resisting any tendency of the vehicle to roll; and further wherein a novel and improved form of wheel support into the main chassis or frame is provided to facilitate front end alignment of the wheels both with respect to toe and chamber.

It is yet another object of the present invention to provide an adjustable suspension system conformable for different sizes and makes of automotive vehicles and which is capable of being incorporated both into the front and rear suspension systems of the vehicle without modifying the existing chassis or frame of the vehicle.

In accordance with the present invention, there has been devised a suspension system for automotive vehicles possessing a number of features which will render the vehicle safe for use under varying conditions, such as, normal highway driving or in racing without in any way disturbing the normal riding characteristics of the vehicle and permitting adjustment of the suspension system to make it readily conformable for use with different sized vehicles under different conditions of use. Broadly, at the front end, cantilevered spring members extend in opposite directions from opposite sides of the vehicle preferably from points of attachment into ball joint assemblies for each wheel, the spring members interleaving or overlapping along their intermediate span and being supported at laterally spaced points by upper and lower bearing members. The cantilevered spring members are pretensioned or stressed so that in their relaxed state prior to application of any load will arch upwardly a sufficient degree so that when the weight of the vehicle is applied, the spring members will assume a substantially horizontal disposition. The frame or chassis of the vehicle is united into front and rear support frames for the bearing members, the front support frame being connected to A-frame assemblies at the front end suspension of the car and the rear frame connected to raised, outboard wings at the rear end of the car. The A-frame assemblies are made up of upper and lower A-frames, each upper A-frame having a unique form of threadedly adjustable rod to regulate the camber and toe of the front wheels. The rod extends through a sleeve provided with a lock nut such that the effective length of each side of an A-frame can be adjusted with respect to one another to establish the desired toe alignment, and the total effective length can be adjusted to set the desired camber in the front wheels.

Each of the support frames for the bearing members includes a series of laterally spaced connection points for adjustably positioning the bearing members so as to regulate the degree of resistance to roll both at the front and rear end suspensions.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is a front view with portions broken away of the preferred form of front suspension system for a racing car;

FIG. 2 is a top plan view of the preferred form shown in FIG. 1;

FIG. 2A is a cross-sectional view in detail of a preferred form of adjustable rod;

FIG. 3 is a side view of the preferred form of invention shown in FIGS. 1 and 2;

FIG. 4 is a rear view of the rear suspension for a racing car adapted for use in combination with the front suspension shown in FIGS. 1 to 3;

FIG. 5 is a top plan view of the rear end suspension shown in FIG. 4;

FIG. 6 is a cross-sectional view of the rear suspension spring assembly in accordance with the present invention; and FIG. 7 is a side view of the rear end suspension in accordance with the present invention.

DETAILED DESCRIPTION OF THE PREFERRED EMBODIMENT

Referring in more detail to the drawings, each of the various Figures presented illustrates the mounting and disposition of the preferred form of suspension system with respect to the existing frame or chassis of a vehicle, and it is therefore helpful to recognize the basic construction and arrangement of the frame members as represented therein. Thus it will be seen from FIGS. 1 and 2 that generally box-shaped, hollow frame members forming a part of the main chassis of the vehicle comprise a pair of lower tubular frames 7 and upper tubular frames 8 as illustrated in FIGS. 1 to 3. Proceeding rearwardly from the front end suspension, as shown in FIG. 5, the lower frames 7 widen on opposite sides of the vehicle as represented at 7A, then through return members 7B continue rearwardly as represented at 7C. Although not illustrated in FIG. 5, FIG. 4 represents both the upper frame portions 8 and lower frames 7C which extend rearwardly in spaced inwardly offset relation to the frames 8. Finally, as represented in FIG. 6, an auxiliary frame 6 extends upwardly from lower frame 7 and extends rearwardly as at 9A along opposite sides of the vehicle to support the rearward suspension system in a manner to be hereinafter described in more detail. Suffice it to say that there is a main common frame or chassis into which the front and rear end suspension systems may be integrated in order to achieve the desired and intended results in accordance with the present invention. It is emphasized that the frame construction illustrated is merely representative of various types of frames and that the suspension system of the present invention is readily conformable for mounting and installation in cooperation with other types of frame assemblies.

An important feature of the present invention resides in the disposition and mounting at the front end of a pair of oppositely directed, cantilevered spring members 11 and 12, the spring member 11 being in the form of an elongated bifurcated leaf spring having spaced parallel elongated spring portions 13 and 14 extending across the substantial width of the chassis from a common connecting end 15 which is secured by ball joint 16 to the underside of lower A-frame assembly 17. The spring portions 13 and 14 traverse the substantial width of the vehicle with the free ends extending beyond the end of the right side frame 7, as viewed in FIGS. 1 and 2, and terminates beneath the upper frame 8 on the righthand side. The spring member 12 is sized to be of a width for extension between the bifurcated portions 13 and 14 of spring 11, spring member 12 having a connecting end 18 secured in a suitable ball joint, not shown, to the underside of lower A-frame assembly 20. In this relation, the spring members 11 and 12 are coplanar or interleaved and are preferably given the same spring constant as well as thickness and are disposed substantially flush to one another so as to occupy a minimum of space. The spring members 11 and 12 are supported in a common plane by support means preferably in the form of upper and lower bearing members 21 and 22 on opposite sides of the suspension system, the end of each spring opposite to its connecting end terminating at a point just beyond A-frame member 7. Each bearing member 21 and 22 is preferably in the form of a roller through which extends a connecting bolt 24, opposite ends of the bolt protruding through openings 25 in opposite vertical walls of a generally channel-shaped support frame 26 for the bearing member. Preferably, a series of openings 25 are formed at laterally spaced intervals on either side of the frame 26 to permit adjustable mounting of the bearing members 21 and 22 and thereby control the degree of flexure and roll resistance imparted by the spring members to the vehicle. Preferably, the bearing support frame 26 is united with the main support frame members 7 and 8 through lower A-frame brackets 28. Upper arm mounts 30 project upwardly from each upper frame 8, and each mount 30 is provided with an elongated vertically extending slot 31 for connection of an upper A-frame assembly 32 on either side of the front end suspension system. Openings or apertures 29 in the lower brackets 28 merely serve as lightening holes for the bracket. As best seen from the righthand view of FIG. 2, there are a pair of front and rear arm mounts 30 on opposite sides of the front end suspension system, each arm mount having spaced parallel plates 33 for insertion therebetween of an adjustment rod 34 projecting forwardly from the divergent ends of upper A-frame 32.

Preliminary to a detailed consideration of the upper A-frame assemblies 32 and their associated adjustment rods 34, it will be seen that the lower A-frame 17 are correspondingly comprised of a pair of horizontally extending arms 36 which, as fully shown on the lefthand side of FIG. 2, diverge inwardly from a common connecting end 37 which is secured by a ball joint 38 to the lower end of a wheel spindle 40. Each arm 36 terminates in a threadedly adjustable bearing 41 which is pivotally connected to a bracket 42 on lower frame 7 by a suitable bolt or pin which is inserted as at 43 through the bearing 41. Preferably, each arm 36 is also of generally tubular configuration and serves as a support for the lower end of a cylinder or dashpot 44 of a shock absorber assembly 45. The upper plunger end 46 of each shock absorber assembly is connected to an extension 47 of the main frame of the vehicle through a pivotal connector 48.

Upper A-frame assemblies 32 are correspondingly comprised of arms 50 which diverge inwardly from a common connecting end 52, the latter secured by ball joint 53 to the upper end of the spindle mount 40, as shown at the lefthand side of FIG. 1. As illustrated in detail in FIG. 2A, the forward divergent end of each arm 50 includes an adjustable rod 34 which has an enlarged joint in the form of a circular end 54 journaled on a pivot 54' extending between the sides 33 of each bracket or arm mount 30; and, at its opposite end, has a threaded portion inserted into an internally threaded sleeve 55, the latter slidably inserted into a tubular portion 58 affixed to each arm 50. An externally threaded stem 56 engages the internally threaded portion of the sleeve 55 to permit threaded adjustment of each sleeve with respect to a respective tubular portion 58 so as to permit effective movement and adjustment of the rods with respect to one another in regulating the toe alignment of the wheel on each side of the vehicle. A lock nut 56 on the threaded portion of the rod 34 serves to lock the threaded portion against the end of the sleeve 55 opposite to the stem 56. Moreover, the rods can be threadedly adjusted together in the same manner to regulate the camber of the front tires. The pivot pins 54 and bolts 54' extend crosswise through aligned elongated slots 31 in each mount 30 and which bolts are secured by suitable nuts so as to permit vertical adjustment of each adjustable rod assembly 34 with respect to the upper arm mounts 30.

Referring now to FIGS. 4 to 6, there is illustrated a preferred form of rear end suspension in which tires T are represented in their locations outwardly of rear axle 60 and differential 61 with drive shaft housing 62. Other elements conventionally utilized in a rear end suspension include upper and lower radius arm 63 and 64, respectively, on opposite sides of tubular frames 7C and which arms 63 and 64 are adjustable in length to adjustably mount the rear end differential 61 in a parallelogram linkage to the vertical support arm 65. It will be noted that each vertical arm 65 is rigidly attached to lower frame 7 and has upper and lower spaced series of holes 66 and 67, respectively, for adjustable positioning of the forward ends of the radius arms 63 and 64. Mounting of the radius arms in this fashion permits floating suspension of the differential assembly with respect to the main chassis or frame.

The rear end suspension illustrated in FIGS. 4 to 6 depicts a somewhat modified form of cantilever spring arrangement in which a first bifurcated spring 70 has common connecting end 71 and split, transversely extending tubular spring portions 72 which traverse the greater width of the vehicle frame in closely spaced parallel relation to one another as shown. Another cantilevered spring member 74 comprised of continuous tubular elongated members 75 extends from the opposite side of the vehicle for insertion between the portions 72 and terminates in a free ends directly over the frame member 7C. The springs are disposed in a common plane in a manner corresponding to that described with reference to the front end suspension and are supported at transversely spaced intervals by pairs of upper and lower bearing members 76 and 77, respectively, there being an upper and lower bearing member 76 and 77 on opposite sides of the spring assembly to support each spring member relatively near its connected end and away from its free end. As shown in FIG. 6, the lower bearing members 77 correspond to the bearings or rollers 22 at the front end and are supported in apertures 79 in a generally channel-shaped frame 78 which extends across the width of the main frame assembly of the vehicle in elevated relation above the rear wheels. However, the upper bearing members 76 are preferably defined by concave or inverted, generally saddle-shaped supports 66 which bear against the upper surfaces of the outside spring portions 72 at one end and corresponding supports 66 bear against the inner spring portions 75 at the opposite end. Each upper bearing 76 is suspended from a sleeve 67 in surrounding relation to a transverse bolt 68 which is connected to the frame 78. In order to extend the width of the spring suspension assembly, the common connecting end 71 is affixed to a circular bearing 81 at the lower end of a ball joint 82 in an upper yoke end 83 which defines an upwardly and outwardly curving extension of a vertical frame support 84 which is rigidly secured to the rear axle 60 and reinforced by a strap 85. Correspondingly, another frame support 84 has an outboard extension 83 for mounting of a ball joint 82 at the upper end of bearing 81 for connection of the outer distal end of the opposite cantilevered spring member 74. Preferably the channel-shaped bearing support 78 is positioned on generally triangular braces 86 on opposite sides thereof which are rigidly affixed to the insides of tubular frames 9A. Standard shock absorbers 88 extend upwardly along opposite sides of the rear end suspension in alignment with the vertical frame supports 84; and for the purpose of illustration, the vertical frame support is shown on the lefthand side of the suspension system in FIG. 4 while the shock absorber assembly 88 is shown on the righthand side. Here, the shock absorber assembly typically may include a lower pivot mount 89 for plunger rod 90 which extends upwardly through cylinder 92, the latter having its upper extremity affixed by a pivot pin 93 directly beneath the spring member 74. Again, while not illustrated in FIG. 4, another shock absorber extends along the opposite side of the vehicle and terminates in a pivot mounting directly beneath the bifurcated spring member 72.

As described, the relative disposition and arrangement of the cantilevered spring members for the front and rear end suspension systems is such that, depending upon the particular frame construction and size of vehicle, either type of suspension system may be employed at the front and rear ends. However, in racing cars it has been found that the front and rear end suspensions as described with reference to the preferred form offer greatly improved performance. Particularly, since the greater weight is generally found toward the rear end of the vehicle and thus have greater load requirements the outboard wing suspension system as described will allow the spring members to be of increased length and establish increased moment arms in sustaining the loads encountered.

In actual practice, it will be appreciated that for instance in negotiating a turn to the left the resultant centrifugal force will result in application of greater downward loading on the righthand side of the vehicle as viewed from the rear of the vehicle and, for example, as represented at R in FIG. 1. Increased loading on the side of the vehicle away from the direction of the turn will create a downward bending moment on the bifurcated spring member about its connecting end which will be imparted through the free end of the bifurcated spring member adjacent to that side nearest the direction of the turn as represented at L. This moment arm and the resultant force developed will be applied in a downward direction counteracting any tendency of the lefthand side of the vehicle to be lifted. The resultant force may be increased by movement of the righthand bearing members 21 and 22 inwardly toward the longitudinal axis of the vehicle; i.e., away from the common connecting end 15 of the spring 11.

Conversely, if the vehicle were to negotiate a turn in the opposite direction or to the right, the greater loading would be sustained at the lefthand side of the vehicle through the lefthand bearing supports 21 and 22 adjacent to the connecting end of the spring element 12. This would create a moment arm or force about the connecting end which would be imparted to the righthand side of the vehicle as represented at R so as to increase the downwardly applied force at that point tending to counteract any tendency to roll. If the vehicle were simply designed to counteract roll in one direction, only a single spring member would be required in each front and rear end suspension system. Nevertheless, from the standpoint of balance and weight distribution, it is preferred to employ oppositely directed, cantilevered spring members in combination.

Correspondingly, in the rear end suspension the spring members are operative in combination with their bearing supports to counteract any tendency of the vehicle to roll or undergo undesirable lifting in response to negotiating sharp turns or otherwise being subjected to cornering loads lateral forces tending to cause roll of the vehicle. A particular advantage in the rear end suspension resides is the outboard wing extensions projecting over the rear wheels so as to increase the effective lengths of the springs and the effective moment arms which can be established through adjustable positioning of the bearing members in the series of laterally spaced apertures 79 formed along the channel-shaped frame 78.

It will be apparent that various modifications and changes may be made in the specific mounting and disposition of the suspension systems and particularly their spring assemblies. For instance, while ball joints have been illustrated as a means for mounting and connection of the ends of the spring members into the frame, other suitable means may be employed. Moreover, while it is preferred to employ roller bearings as the supporting elements above and beneath each side of the spring assembly, other forms of supports may be employed which are capable of establishing the desired moment arm while permitting lengthwise adjustment of the spring members with respect to one another and to the vehicle, as typified by the upper bearing supports 76 in the rear end suspension. Moreover, flat or slightly curved plates or rods may be employed in place of the roller bearings to sandwich the spring members therebetween. It will be observed also that the compact disposition and mounting of the spring members affords great latitude in the selection of the optimum form of suspension system to be employed therewith. Thus, the adjustable A-frame assemblies employed at the front end affords maximum latitude in the vertical adjustment of the upper frames 32 into the bracket mounts 30. Similarly, the threadedly adjustable rod assemblies 34 afford an extremely effective means of lateral adjustment individually and in combination to regulate the toe and camber of the front wheels.

It is therefore to be understood that various modifications and changes may be made in the construction and arrangement of parts, their mounting and positioning with respect to the frame of a vehicle without departing from the spirit and scope of the present invention as defined by the appended claims.

I claim:

1. In a vehicle suspension system wherein a chassis is supported by laterally spaced wheels, there being a pair of wheels located at opposite sides of the front and rear ends of said chassis, the improvement comprising:

at least one laterally extending cantilevered spring member extending from connection to one of said wheel, said spring member connected to traverse the substantial span between a pair of wheels at one of said front and rear ends, and the end of said spring member opposite said connected end bearing against said chassis, a second laterally extending, cantilevered spring member extending from connection to another of said pair of wheels opposite to said connected end of said one spring member, said second spring member dimensioned to traverse the substantial span between said pair of wheels in juxtaposed relation to said one laterally extending cantilevered spring member, said one spring member being bifurcated throughout its greater length to define spaced parallel spring portions, and said second spring member dimensioned to be of a width for extension between said spaced parallel spring portions; and support means disposed above and bearing against said spring members at intermediate points along the length of said springs relatively near the connected end of each said spring member and away from the opposite end, said support means being secured to said chassis whereby an unbalanced, downwardly directed force imparted to said support means is operative to generate a downwardly directed bending moment about said connected end which is imparted through the opposite end of each said spring member to said chassis.

2. In a vehicle suspension system according to claim 1, including second support means secured to said chassis about said second spring member at a point relatively near the connected end of said spring member and away from the opposite end thereof, said second support means bearing against said second spring member whereby unbalanced downwardly directed forces imparted to said second support means is operative to generate a downwardly directed bending moment about the connected end of said second spring member through the opposite end and into said chassis.

3. In a vehicle suspension system according to claim 1, including first and second support means at spaced intermediate points along the span of said spring members, each being relatively near the connected end of said respective spring member and away from its opposite end, and each being secured to said chassis above said spring members so as to be operative to bear downwardly against said spring members in response to downwardly directed forces applied thereto.

4. In an automotive suspension system wherein a chassis is supported by laterally spaced wheels, there being a pair of wheels on opposite sides of its front and rear ends, the combination therewith comprising:

a pair of laterally extending, cantilevered spring members connected to opposite wheels at the front and rear ends of said suspension system for lateral extension across the substantial span between each pair of wheels and each of said front and rear ends, said chassis including upwardly directed outboard extensions to support the spring members at the rear end of said suspension system above said rear wheels and above said spring members at the front end of said suspension system; and upper and lower support means aligned with one another above and below each pair of spring members at spaced intermediate points along the span between each pair of wheels, one of said upper and lower support means located relatively near the connected end of a spring member and away from its opposite end and each of said upper and lower support means secured to said frame to bear against the upper and lower surfaces of said spring members.

5. In an automotive system according to claim 4, said spring members being of elongated tubular configuration and said upper bearings being in the form of inverted saddle-shaped supports bearing downwardly against said spring members.

6. In an automotive suspension system wherein a chassis is supported by laterally spaced wheels, there being a pair of wheels on opposite sides of its front and rear ends, the combination therewith comprising:

a pair of laterally extending, cantilevered spring members connected to opposite wheels at the front and rear ends of said suspension system for lateral extension across the substantial span between each pair of wheels and each of said front and rear ends; and upper and lower support means aligned with one another above and below each pair of spring members at spaced intermediate points along the span between each pair of wheels, one of said upper and lower support means located relatively near the connected end of a spring member and away from its opposite end and each of said upper and lower support means secured to said frame to bear against the upper and lower surfaces of said spring members, said spring members having bifurcated spring portions extending in spaced parallel relation to one another across the substantial span between opposite wheels and the other of said spring members of a pair dimensioned for extension in parallel relation between said spaced parallel spring portions across the substantial span between opposite wheels whereby unbalanced downwardly directed forces imparted to one side of said vehicle are operative to generate a bending moment about the connected end of a spring member which is imparted to the opposite end of said respective spring member into said chassis.

7. In an automotive suspension system according to claim 6, each of said spring members being of elongated narrow configuration and having a generally rectangular cross-section.

8. In an automotive suspension system according to claim 6, each of said spring members being normally bowed in a direction such that the intermediate portion of each said spring member is higher than opposite ends thereof in the absence of a force applied thereto.

9. In an automotive suspension system according to claim 6, each of said upper and lower support means defined by bearings, and a generally channel-shaped frame member secured to said chassis and operative to support said bearings in spaced parallel relation to one another with said spring members extending between said upper and lower bearings.

10. A vehicle suspension system comprising:
a chassis supported by laterally spaced wheels, there being a pair of wheels located at opposite sides of the front and rear ends of said chassis, an A-frame extending laterally from each front wheel for pivotal connection to said chassis, a pair of laterally extending cantilevered spring member extending from connection to one of said A-frames, said spring members connected to traverse the substantial span between a pair of wheels at one of said front and rear ends, and the end of said spring member opposite said connected end bearing against said chassis; and upper and lower bearing support means aligned with one another above and below each pair of spring members at spaced intermediate points along the span between the front wheels, one of said upper and lower support means located relatively near the connected end of each spring member and away from its opposite end, each of said upper and lower support means defined by rollers, a frame member secured to said chassis and operative to support said rollers in spaced parallel relation to one another with said spring members extending between said upper and lower rollers whereby unbalanced downwardly directed forces imparted to one side of said vehicle are operative to generate a bending moment about the connected end of a spring member which is imparted through the opposite end of said spring member to said chassis in response to a cornering load applied thereto.

11. A vehicle suspension system according to claim 10, there being spaced upper and lower A-frames at each front wheel end, and upper threadedly adjustable rod connecting means between each said upper A-frame and said chassis.

12. A vehicle suspension system according to claim 10, said frame member being a channel-shaped frame member on said chassis, said rollers supported in said channel-shaped frame at spaced intermediate points along the span of said spring members, each roller being relatively near the connected end of said respective spring member and away from its opposite end, and each roller being secured to said frame above said spring members whereby to be operative to bear downwardly against said spring members in response to downwardly directed forces applied thereto.

13. An automotive suspension system comprising:
a chassis supported by laterally spaced wheels, there being a pair of wheels on opposite sides of its front and rear ends, upper and lower A-frames extending laterally from each front wheel for pivotal connection to said chassis, a pair of laterally extending, cantilevered spring members each connected at one end to one of said lower A-frame for lateral extension across the substantial span between said front wheels, one of said spring members having bifurcated spring portions extending in spaced parallel relation to one another across the substantial span between said front wheels and the other of said spring members dimensioned for extension in parallel relation between said spaced parallel spring portions across the substantial span between said front wheels; and upper and lower bearing support means aligned with one another above and below each pair of spring members at spaced intermediate points along the span between said front wheels, one of said upper and lower support means located relatively near the connected end of each spring member and away from its opposite end, each of said upper and lower support means secured to said frame to bear against the upper and lower surfaces of said spring members whereby unbalanced downwardly directed forces imparted to one side of said vehicle are operative to generate a bending moment about the connected end of a spring member which is imparted to the opposite end of said respective spring member into said chassis.

14. An automotive suspension system according to claim 13, each of said spring members being of elongated narrow configuration and normally bowed in a direction such that the intermediate portion of each said spring member is higher than opposite ends thereof in the absence of a force applied thereto.

15. In an automotive suspension system according to claim 13, each of said upper and lower support means defined by rollers, and a generally channal-shaped frame member secured to said chassis and operative to support said rollers in spaced parallel relation to one another with said spring members extending between said upper and lower rollers.

16. An automotive suspension system according to claim 13, a pair of spring members at the rear end of said suspension system being elevated with respect to said spring members at the front end of said suspension system, said chassis including upwardly directed outboard extensions to support the spring members at the rear end of said suspension system above said rear wheels.

* * * * *

UNITED STATES PATENT AND TRADEMARK OFFICE
CERTIFICATE OF CORRECTION

PATENT NO. : 4,422,666

DATED : December 27, 1983

INVENTOR(S) : Rudy R. Proctor

It is certified that error appears in the above—identified patent and that said Letters Patent is hereby corrected as shown below:

IN THE SPECIFICATION:

Column 2, line 30, cancel "chamber" and substitute -- camber --.

Column 3, line 59, cancel "6" and substitute -- 9 --.

IN THE CLAIMS:

Column 12, line 7 (Claim 15) cancel "channal-shaped" and substitute -- channel-shaped --.

Signed and Sealed this

Sixth Day of November 1984

[SEAL]

Attest:

GERALD J. MOSSINGHOFF

Attesting Officer

Commissioner of Patents and Trademarks